US009522376B2

(12) United States Patent
Peterman et al.

(10) Patent No.: US 9,522,376 B2
(45) Date of Patent: Dec. 20, 2016

(54) PROCESS FOR FLUID CATALYTIC CRACKING AND A RISER RELATED THERETO

(75) Inventors: Raymond Peterman, Glen Ellyn, IL (US); Chad R. Huovie, Park Ridge, IL (US); Patrick D. Walker, Park Ridge, IL (US)

(73) Assignee: UOP LLC, Des Plaines, IL (US)

(*) Notice: Subject to any disclaimer, the term of this patent is extended or adjusted under 35 U.S.C. 154(b) by 992 days.

(21) Appl. No.: 13/492,025

(22) Filed: Jun. 8, 2012

(65) Prior Publication Data

US 2013/0331631 A1 Dec. 12, 2013

(51) Int. Cl.
| | | |
|---|---|---|
| *B01J 19/00* | (2006.01) | |
| *C07C 4/06* | (2006.01) | |
| *B01J 8/18* | (2006.01) | |
| *B01J 29/90* | (2006.01) | |
| *C10G 11/18* | (2006.01) | |
| *B01J 38/30* | (2006.01) | |

(52) U.S. Cl.
CPC .............. *B01J 8/1827* (2013.01); *B01J 8/1863* (2013.01); *B01J 8/1872* (2013.01); *B01J 29/90* (2013.01); *C10G 11/18* (2013.01); *B01J 38/30* (2013.01)

(58) Field of Classification Search
CPC .................................... B01J 19/00; C07C 4/06
USPC .................................. 422/129; 585/653, 752
See application file for complete search history.

(56) References Cited

U.S. PATENT DOCUMENTS

| | | | |
|---|---|---|---|
| 4,895,637 A | 1/1990 | Owen | |
| 4,921,596 A | 5/1990 | Chou et al. | |
| 5,034,115 A | 7/1991 | Avidan | |
| 5,139,748 A | 8/1992 | Lomas et al. | |
| 5,306,418 A | 4/1994 | Dou et al. | |
| 5,538,625 A * | 7/1996 | Sigaud et al. | 585/648 |
| 5,616,237 A | 4/1997 | Krishna et al. | |
| 5,948,241 A | 9/1999 | Owen | |
| 6,162,402 A * | 12/2000 | Lomas | 422/144 |
| 6,558,531 B2 * | 5/2003 | Steffens et al. | 208/113 |
| 7,658,889 B2 * | 2/2010 | Roux et al. | 422/145 |
| 7,682,501 B2 | 3/2010 | Soni et al. | |
| 2006/0144758 A1 * | 7/2006 | Swan et al. | 208/113 |
| 2007/0205139 A1 | 9/2007 | Kulprathipanja et al. | |
| 2008/0081006 A1 * | 4/2008 | Myers et al. | 422/145 |
| 2009/0188835 A1 | 7/2009 | Baptista et al. | |
| 2009/0189835 A1 | 7/2009 | Kim et al. | |
| 2010/0158767 A1 | 6/2010 | Mehlberg et al. | |

FOREIGN PATENT DOCUMENTS

| | | |
|---|---|---|
| RU | 2391382 C2 | 6/2010 |
| RU | 2449003 C2 | 4/2012 |

OTHER PUBLICATIONS

Search Report dated Oct. 10, 2013 for corresponding PCT application.

* cited by examiner

Primary Examiner — Walter D Griffin
Assistant Examiner — Huy-Tram Nguyen

(57) ABSTRACT

One exemplary embodiment may be a process for fluid catalytic cracking. The process can include providing a stream through a plurality of distributors to a riser terminating in a reaction vessel. Often, the plurality of distributors includes a first distributor set having at least two distributors positioned around a perimeter of the riser, a second distributor set having at least two distributors positioned around the perimeter of the riser, and a third distributor set having at least two distributors positioned around the perimeter of the riser.

19 Claims, 3 Drawing Sheets

PROCESS FOR FLUID CATALYTIC CRACKING AND A RISER RELATED THERETO

FIELD OF THE INVENTION

This invention generally relates to a process for fluid catalytic cracking and an apparatus related thereto.

DESCRIPTION OF THE RELATED ART

Fluid catalytic cracking (FCC) can be a catalytic conversion process for cracking heavy hydrocarbons into lighter hydrocarbons by bringing the heavy hydrocarbons into contact with a catalyst composed of finely divided particulate material in a fluidized reaction zone. Most FCC units use a zeolite-containing catalyst having high activity and selectivity. As the cracking reaction proceeds, substantial amounts of highly carbonaceous material, referred to as coke, may be deposited on the catalyst forming spent catalyst. Generally, a high temperature regeneration burns the coke from the spent catalyst. The regenerated catalyst may be cooled before being returned to the reaction zone. Typically, spent catalyst is continually removed from the reaction zone and replaced by essentially coke-free catalyst from the regeneration zone.

Often, the basic components of the FCC process include a riser, a reaction vessel, and a regenerator. In the riser, a distributor may inject a hydrocarbon feed that can contact the catalyst and be cracked into lighter hydrocarbons. A lift gas may be used to accelerate catalyst in a lower section of the riser below or during introduction of the feed. The lift velocity can refer to the velocity of the gas and the lifted catalyst just before feed distribution into the riser. Catalyst and hydrocarbon feed may be transported upwardly in the riser by the expansion of the gases that may result from the vaporization of the hydrocarbons. Often, coke accumulates on the catalyst particles as a result of the cracking reaction. The reaction vessel may disengage spent catalyst from product vapors. A catalyst stripper can remove adsorbed hydrocarbons from the surface of the catalyst. Generally, the regenerator burns the coke from the catalyst and recycles the regenerated catalyst into the riser.

Fluid catalytic cracking riser hydrodynamics can be improved to approach plug flow by injection of a vapor downstream of a primary feed injection zone. Improving riser hydrodynamics may result in a higher conversion of the feedstock and improved product selectivities. Often, a feedstock is in a gas phase and velocities tend to be highest in the center of the riser and much lower near the riser wall. As such, current fluid catalytic cracking risers may contain a higher density of catalyst along a riser wall. This uneven density and velocity profile at any given elevation may result in overcracking at the riser wall and lower conversion at the center of the riser. Generally, injection of a gas, such as steam or fuel gas, downstream of the primary feed injection zone may improve mixing of the catalyst and gas feedstock and can result in improved conversion and improved selectivities. However, there is a desire to optimize the gas injection technology to further improve catalyst and feed mixing downstream of a primary feed injection.

SUMMARY OF THE INVENTION

One exemplary embodiment may be a process for fluid catalytic cracking. The process can include providing a stream through a plurality of distributors to a riser terminating in a reaction vessel. Often, the plurality of distributors includes a first distributor set having at least two distributors positioned around a perimeter of the riser, a second distributor set having at least two distributors positioned around the perimeter of the riser, and a third distributor set having at least two distributors positioned around the perimeter of the riser. Typically, the third distributor set is positioned above the second distributor set and the second distributor set is positioned above the first distributor set. Moreover, the at least two distributors of the third distributor set can be radially staggered from the at least two distributors of the second distributor set and the at least two distributors of the second distributor set may be radially staggered from the at least two distributors of the first distributor set.

Another exemplary embodiment can be a fluid catalytic cracking apparatus. The fluid catalytic cracking apparatus may include a riser, which, in turn, may include a first distributor set including at least two distributors positioned around a perimeter of the riser at a first elevation, a second distributor set including at least two distributors positioned around the perimeter of the riser at a second elevation, and a third distributor set including at least two distributors positioned around the perimeter of the riser at a third elevation. Usually, a first vertical distance between the first and second distributor sets is less than a second vertical distance between the second and third distributor sets.

A further exemplary embodiment may be a fluid catalytic cracking apparatus. The fluid catalytic cracking apparatus can include a riser, which, in turn, may include a first distributor set including at least two distributors positioned around a perimeter of the riser at a first elevation, a second distributor set including at least two distributors positioned around the perimeter of the riser at a second elevation, and a third distributor set including at least two distributors positioned around the perimeter of the riser at a third elevation. Usually, the at least two distributors of the first distributor set are radially staggered from the at least two distributors of the second distributor set and the at least two distributors of the second distributor set are radially staggered from the at least two distributors of the third distributor set.

The embodiments provided herein can provide multiple sets of gas distributors at several elevations downstream of a primary distributor. The vertical distance between the sets of various gas distributors can increase as one moves downstream up the riser. The number of gas distributors may be the same or different as the number of primary feed gas distributors and their positions may be radially staggered. The radial positions of gas distributors should be rotated as one moves downstream, i.e. up the riser, from one distributor set to the next. The number of gas distributors in each set can be decreased further up the riser. Moreover, each gas distributor, independently, can be orientated about 10-about 170° from vertical. These embodiments can provide a more even density profile of the catalyst within the riser, and thereby increasing hydrocarbon conversion.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n"

represents the number of carbon atoms in the one or more hydrocarbon molecules. Furthermore, a superscript "+" or "−" may be used with an abbreviated one or more hydrocarbons notation, e.g., $C3^+$ or $C3^−$, which is inclusive of the abbreviated one or more hydrocarbons. As an example, the abbreviation "$C3^{+}$" means one or more hydrocarbon molecules of three carbon atoms and/or more. Also, a stream can include one or more fluids other than or in addition to hydrocarbons, such as air, nitrogen, and steam.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

As used herein, the term "fluid catalytic cracking" may be abbreviated herein as "FCC".

As used herein, the term "spent catalyst" can refer to catalyst particles having accumulated coke as a result of a cracking reaction.

As used herein, the term "kilopascal" may be abbreviated "KPa" and all pressures disclosed herein are absolute.

As used herein, the term "vapor" can mean a gas or a dispersion that may include or consist of one or more hydrocarbons.

As used herein, the term "radially staggered" means that at least 50% of the distributors from a first distributor set at a first elevation on a riser are offset from at least 50% of the distributors of an adjacent distributor set at a different elevation and 50% or less of the distributors of the first distributor set are aligned with any of the distributors of the adjacent distributor set as viewed directly above or below the riser. Preferably, none of the distributors from adjacent sets are aligned as viewed directly above or below the riser, but if adjacent sets have different numbers of distributors, one or two distributors from each set may be aligned, while the remaining distributors are offset.

DETAILED DESCRIPTION

Figure 1:
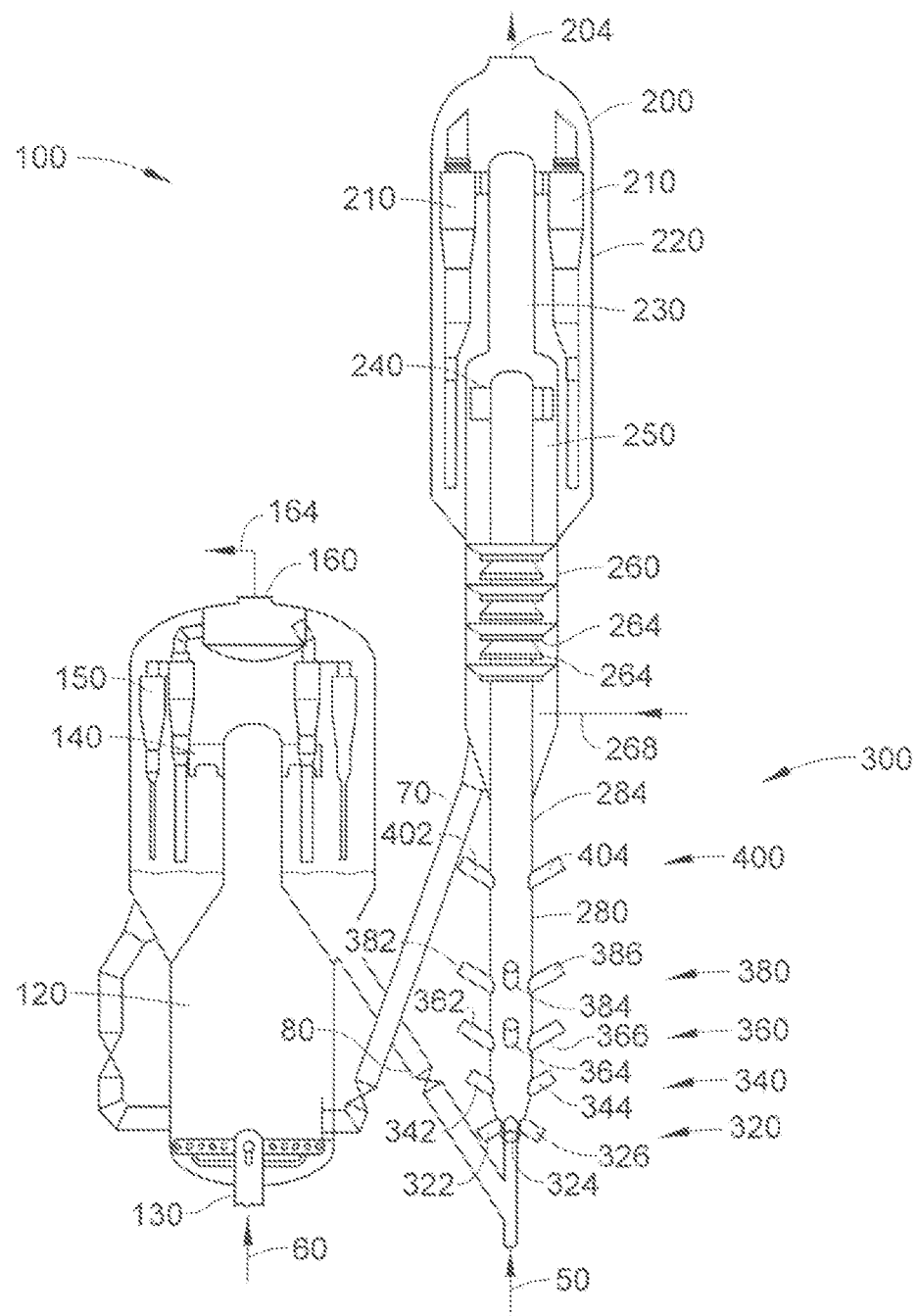
FIG. 1 is a schematic depiction of an exemplary fluid catalytic cracking apparatus.

Referring to FIG. 1, an FCC apparatus 100 may be used in an FCC process. The FCC apparatus 100 can include a regenerator 120 and a riser-reactor 200. The riser-reactor 200 may include a reaction vessel 220, a stripping zone 260, and a riser 280. Generally, the feed can have a boiling point range of about 180-about 800° C. The feed can be at least one of a gas oil, a vacuum gas oil, an atmospheric gas oil, an atmospheric residue, and a vacuum residue. Alternatively, the feed may be at least one of a heavy cycle oil and a slurry oil. The feed may have a temperature of about 140-about 430° C., preferably about 200-about 290° C.

The feed may be injected through a plurality of distributors 300, particularly only those of a first distributor set 320. The plurality of distributors 300 can further include a second distributor set 340, a third distributor 360, a fourth distributor set 380, and a fifth distributor set 400. A lift gas, including one or more C1-C4 hydrocarbons, and/or steam may be provided, independently, to the second distributor set 340, the third distributor 360, the fourth distributor set 380, and the fifth distributor set 400. In other embodiments, the feed, lift gas and/or steam can be provided to any of the distributors of the plurality of distributors 300. The plurality of distributors 300 is discussed in further detail hereinafter.

Generally, the feed including one or more hydrocarbons may be contacted with a lift gas stream 50 and catalyst. The zeolitic molecular sieves used in typical FCC gasoline mode operation may have a large average pore size. Usually, molecular sieves with a large pore size have pores with openings of greater than about 0.7 nm in effective diameter defined by greater than about 10 and typically about 12 membered rings. Suitable large pore molecular sieves may include synthetic zeolites such as X-type and Y-type zeolites, mordenite and faujasite. Often, low rare earth content denotes less than or equal to about 1.0%, by weight, rare earth oxide on the zeolitic portion of the catalyst. Catalyst additives may be added to the catalyst composition during operation. The riser 280 may operate with a catalyst to oil weight ratio of about 4:1-about 12:1, preferably about 4:1-about 10:1. In addition, steam may be provided to the riser 280 instead of the feed, and may be provided in an amount of about 3-about 15%, preferably about 4-about 12%, by weight, of the hydrocarbon feed. Generally, the lift gas stream 50 includes an inert gas such as steam or a fuel gas provided by the lift gas distributor. The lift velocity typically does not exceed 10 meters per second.

Typically, the feed may be cracked in the riser 280 in the presence of catalyst to form a cracked stream. The plurality of distributors 300 may be located at different radial positions to improve feedstock distribution in the riser 280 and mixing with catalyst. The feed pressure drop across a single distributor may be about 170-about 800 KPa, preferably about 300-about 520 KPa. The steam may be added to hydrocarbon feed prior to ejection from the distributor, and may be about 0.5-about 7%, by weight, and preferably about 1-about 6%, by weight, based on the weight of the hydrocarbon feed from the distributor. Often, the injected feed mixes with the catalyst and moves up the riser 280 and enters the reaction vessel 220. The riser 280 may operate in a temperature range of about 420-about 650° C., preferably about 480-about 600° C. The pressure in the riser 280 may be about 200-about 350 KPa.

In the reaction vessel 220, the blended catalyst and reacted feed vapors are then discharged from the top of the riser 280 through a riser outlet and separated into a cracked product vapor stream and a collection of catalyst particles covered with substantial quantities of coke and generally referred to as spent catalyst. Swirl arms 240, provided at the end of the riser 280, may further enhance initial catalyst and cracked hydrocarbon separation by imparting a tangential velocity to the exiting catalyst and cracked product vapor stream mixture. Usually, the swirl arms 240 are located in an upper portion of a separation chamber 250, and the stripping zone 260 is situated in the lower portion of the separation chamber 250. Catalyst separated by the swirl arms 240 may drop down into the stripping zone 260.

The cracked product vapor stream including cracked hydrocarbons including gasoline and some catalyst may exit the separation chamber 250 via a gas conduit 230 in communication with one or more cyclones 210. The one or more cyclones 210 may remove remaining catalyst particles from a product vapor stream to reduce particle concentrations to very low levels. The product vapor stream may exit the top of the reaction vessel 220 as a product stream 204.

The FCC apparatus 100 may convert a feed to gasoline and lighter products with about 90%, by volume, of the gasoline product boiling at or below about 193° C. using ASTM D-86. The conversion may be about 55-about 90%, by volume, as produced.

Catalyst separated by the one or more cyclones 210 may pass through at least one dipleg into a dense bed where catalyst may pass from the separation chamber 250 to the stripping zone 260. Often, the stripping zone 260 removes adsorbed and entrained hydrocarbons from the catalyst by counter-current contact with steam over optional baffles 264. Steam may enter the stripping zone 260 through a line 268. Typically, a catalyst conduit 70 transfers coked catalyst to the regenerator 120.

The regenerator 120 can include a regenerator distributor 130, a tee disengager 140, and one or more regenerator cyclones 150. The regenerator 120 may receive the coked catalyst and typically combusts the coke from the surface of the catalyst particles by contact with an oxygen-containing gas, often provided by an air stream 60. Generally, the oxygen-containing gas enters the bottom of the regenerator 120 via the regenerator distributor 130. The dry air rate to the regenerator 120 may be about 3.6-about 6.3 kg/kg coke. The hydrogen in the coke may be about 4-about 8%, by weight, and the sulfur in the coke may be about 0.6-about 3.0%, by weight. Catalyst coolers may be used on the regenerator 120. Additionally, the regenerator 120 may be operated under partial carbon monoxide combustion conditions. Moreover, water or light cycle oil may be added to the bottom of the riser 280 to maintain the appropriate temperature range in the FCC apparatus 100.

Typically, flue gases pass upwardly through the regenerator 120. A primary separator, such as the tee disengager 140, initially separates catalyst from flue gas. Regenerator cyclones 150, or other means, remove entrained catalyst particles from the rising flue gas before the flue gas exits the vessel through an outlet 160 as a flue gas stream 164. Combustion of coke from the catalyst particles may raise the temperatures of the catalyst. The catalyst may pass, regulated by a control valve, through a regenerator standpipe 80 that can communicate with a bottom portion of riser 280. Regenerated catalyst from the regenerator standpipe 80 usually has a temperature of about 640-about 760° C.

The riser 280 can include the plurality of distributors 300, which are preferably feed nozzles. Any suitable tip design or hole pattern can be utilized. Desirably, a nozzle is utilized that provides a gas velocity of about 15-out 50 meter per second.

Although the five distributor sets 320, 340, 360, 380, and 400 are depicted, it should be understood that any suitable number of distributor sets can be utilized, such as 2-10. Generally, the distributor sets 320, 340, 360, 380, and 400 are at different elevations on the riser 280, which may be indicated as, respectively, a first elevation, a second elevation, a third elevation, a fourth elevation, and a fifth elevation. Typically, the distributor sets 320, 340, 360, 380, and 400 can provide hydrocarbons, e.g., feed or lift gas, and/or steam to the riser 280. Generally, the distributor set 320 provides feed, and the distributor sets 340, 360, 380, and 400 provide lift gas and/or steam to the riser 280.

Figure 2:
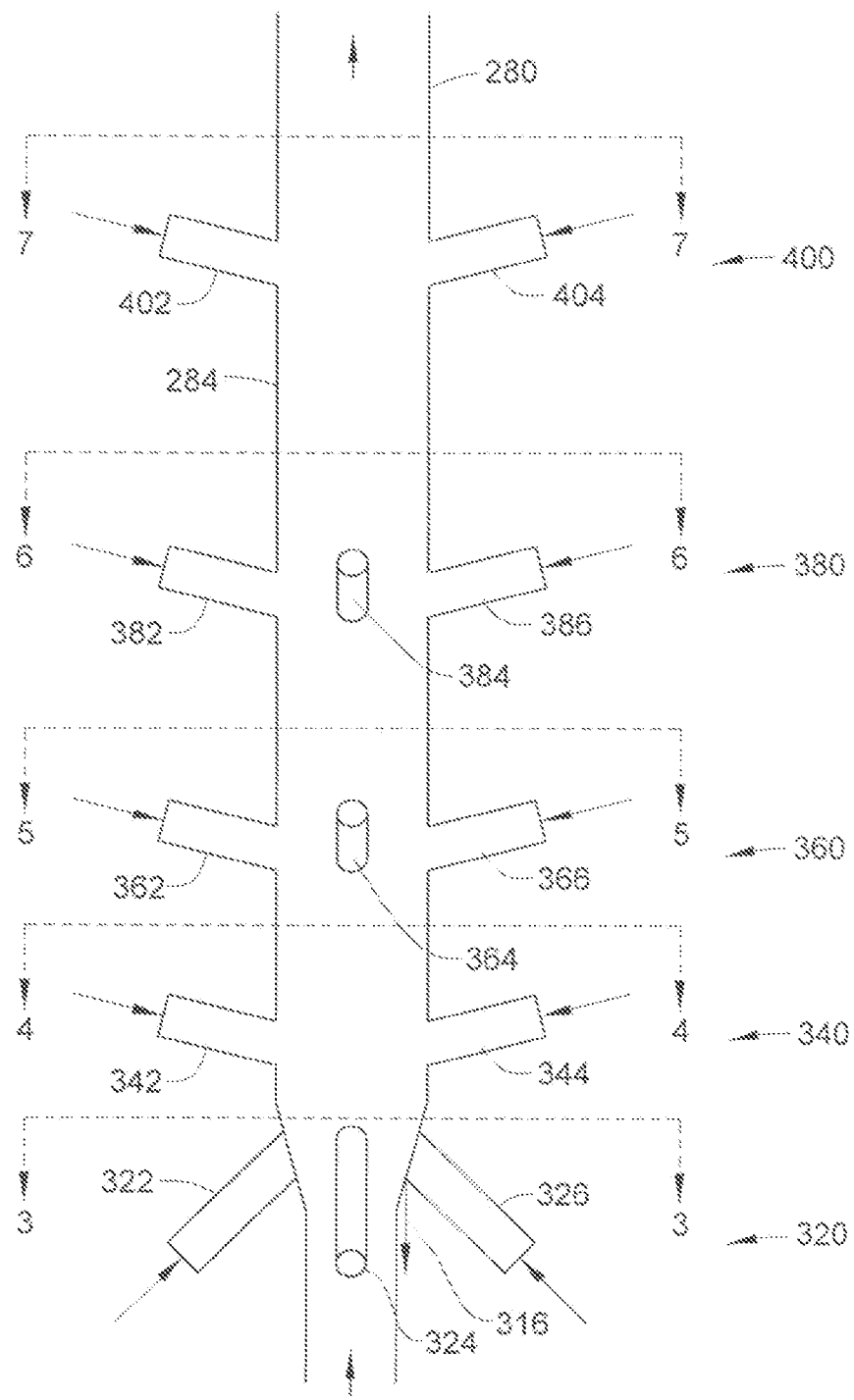
FIG. 2 is a front, elevational view of a portion of an exemplary riser.

Referring to FIG. 2, a portion of the riser 280 is highlighted. Generally, the riser 280 has a perimeter 284, such as a periphery, with various distributors 300 attached. Particularly, the distributor sets 320, 340, 360, 380, and 400 are depicted. Each distributor set 320, 340, 360, 380, and 400 can be separated by an increasing vertical distance between the sets. The vertical distance may be determined, e.g., from the top of a first distributor to the bottom of a second distributor of an adjacent set above, as measured at the juncture of the top of the first distributor to the juncture of the bottom of the second distributor with the riser 280. As an example, the vertical distance between the distributor sets 320 and 340 can be exceeded by the vertical distance of the distributor sets 340 and 360. Generally, the vertical distance between the distributor sets 340 and 360 can exceed the vertical distance between the distributor sets 320 and 340 by at least a ratio of about 1.3:1. The vertical distance between the distributor sets 360 and 380 can exceed the vertical distance between the distributor sets 320 and 340 by at least a ratio of about 1.7:1. In addition, the vertical distance between the distributor sets 380 and 400 can exceed the vertical distance between the distributor sets 320 and 340 by at least a ratio of about 3.3:1. In one exemplary embodiment, the vertical distance between the distributor sets 320 and 340 can be about 0.4-about 1.4 meter, the vertical distance between the distributor sets 340 and 360 can be about 0.7-about 1.7 meter, the vertical distance between the distributor sets 360 and 380 can be about 1.0-about 2.0 meter, and the vertical distance between the distributor sets 380 and 340 can be about 2.5-about 3.5 meter. As the hydrocarbons crack within the riser 280, the volume of the hydrocarbons in the riser 280 can increase as well as the speed of material traveling up the riser 280. Thus, the vertical distance between the distributor sets can be increased to correspond to the increase in material traveling up the riser 280.

Figure 3:
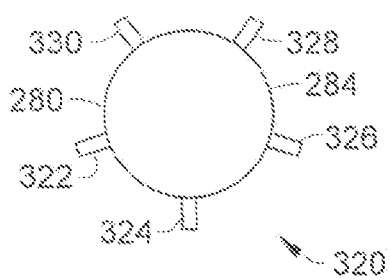
FIG. 3 is a cross-sectional view along line 3-3 in FIG. 2.

Referring to FIG. 3, the first distributor set 320 is depicted having five distributors, namely distributors 322, 324, 326, 328, and 330. Generally, the distributors 322, 324, 326, 328, and 330 can be spaced evenly around the perimeter 284 of the riser 280. Although five distributors are depicted, any suitable number may be utilized. In this instance, the distributors 322, 324, 326, 328, and 330 can be spaced apart by about 72°. However, the distributors 322, 324, 326, 328, and 330 can be distributed unevenly around the perimeter 284 and be spaced apart by any suitable degree.

Generally, the distributors from the first distributor set 320 that are upstream of the other distributors, i.e., at the bottom of the riser 280, may be considered the primary distributor(s). In addition, each distributor 322, 324, 326, 328, and 330 can be orientated with respect to the perimeter 284 at any suitable angle. As an example, the distributor 326 can be orientated at a degree of about 10-about 170°, about 60-about 120°, about 70-about 110°, or about 100-about 110° with respect to a vertical ray 316 extending downward at the lower juncture of the distributor 326 with the riser 280. In other words, one preferred embodiment has a distributor pointing up about 30° to pointing down about 30° from horizontal, corresponding to about 60-about 120° with respect to a vertical ray extending downward.

Referring to FIG. 2, the distributor 326 in this exemplary embodiment can be orientated about 40-about 60° as measured from the vertical ray 316 extending downward. Generally, distributors pointing downward, i.e., greater than about 90° with respect to a vertical ray extending downward at the lower juncture of the distributor with the riser 280, can aid maintenance by allowing catalyst to drain from the distributor.

Figure 4:
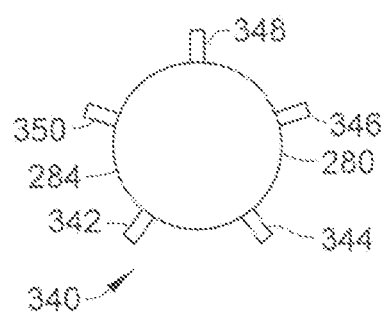
FIG. 4 is a cross-sectional view along line 4-4 in FIG. 2.

Referring to FIG. 4, the second distributor set 340 can include five distributors, namely distributors 342, 344, 346, 348, and 350. Similarly as the first distributor set 320, five distributors are depicted. However any suitable number of distributors can be utilized. In addition, these distributors may be distributed evenly around the perimeter 284, but any suitable arrangement and number of distributors can be utilized.

Generally, the distributors 342, 344, 346, 348, and 350 of the second distributor set 340 can be radially staggered, in this case by about 36°, with respect to the distributors 322, 324, 326, 328, and 330 of the first distributor set 320. The radially staggering of the sets is discussed in further detail below.

In the second distributor set 340, the distributor 342 can define an angle of about 100-about 110° with a vertical ray extending downward. Such an orientation can facilitate mixing of catalyst, gas, and hydrocarbons by injecting the gas counter-current to the flow of material in the riser 280 thereby inducing more turbulence. The other distributors 344, 346, 348, and 350 in the second distributor set 340 can be at the same or different angle. Moreover, the angle of the distributors from each set can vary independently within a set or with respect to the other distributors in the other sets.

Figure 5:
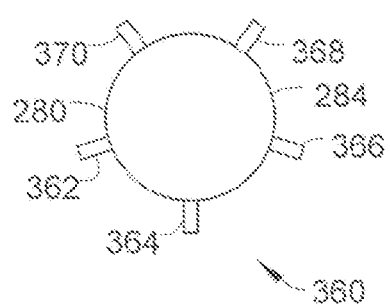
FIG. 5 is a cross-sectional view along line 5-5 of FIG. 2.

Referring to FIG. 5, the third distributor set 360 can include five distributors, namely a distributor 362, a distributor 364, a distributor 366, a distributor 368, and a distributor 370. The radial arrangement of distributors in the third distributor set 360 can be similar to the first distributor set 320. Moreover, the angle with respect to vertical of each distributor of the third distributor set 360 can be similar or different to those of the second distributor set 340.

Figure 6:
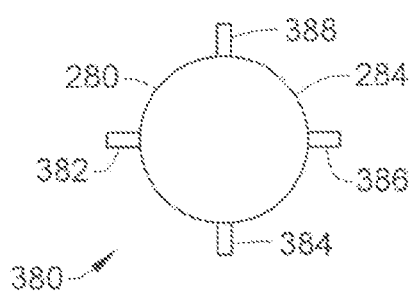
FIG. 6 is a cross-sectional view along line 6-6 of FIG. 2.

Referring to FIG. 6, the fourth distributor set 380 can include four distributors, namely a distributor 382, a distributor 384, a distributor 386, and a distributor 388, which can be positioned evenly around the perimeter 284 of the riser 280 although any suitable arrangement may be used including an uneven arrangement. In this particular embodiment, the distributors 382, 384, 386, and 388 are separated by about 90° from one distributor to the next. The vertical angle of each distributor 382, 384, 386, and 388, independently, can be as described above.

Figure 7:
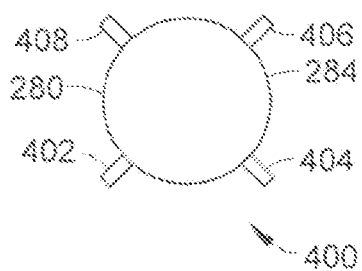
FIG. 7 is a cross-sectional view along line 7-7 of FIG. 2.

Referring to FIG. 7, a fifth distributor set 400 can include four distributors, namely distributors 402, 404, 406, and 408. Again, these distributors are distributed evenly around the perimeter 284, although any suitable arrangement may be utilized, including an uneven distribution. Moreover, each distributor 402, 404, 406, and 408 is separated from the others by about 90°. The vertical angle of each distributor 402, 404, 406, and 408 can be as described above for the other distributors.

Each distributor can be installed, independently, to protrude no more than about 50 millimeters into the riser 280, although any suitable distance may be utilized. Such a minimal protrusion can provide some flow disruption but avoid erosion. Any suitable distributor orientation and elevation can be utilized with any particular riser.

Generally, the distributors can be radially staggered with respect from one set to the next set. Particularly, a set of distributors can be radially staggered with respect to an adjacent set. As an example, the second distributor set 340 can be radially staggered with respect to the first distributor set 320 and the third distributor set 360. In this instance, the distributors 342, 344, 346, 348 and 350 are radially staggered by about 18° with respect to respective distributors 322, 324, 326, 328, and 330 of the first distributor set 320. Moreover, at least some of the distributors of the second distributor set 340 are radially offset with at least one distributor 362, 364, 366, 368, and 370 of the third distributor set 360. With respect to the fourth distributor set 380, the four distributors 382, 384, 386 and 388 are radially staggered about 45° with respect to the distributors 402, 404, 406, and 408 of the fifth distributor set 400. Additionally, at least some of the distributors 382, 384, 386, and 388 of the fourth distributor set 380 are radially staggered with respect to at least one distributor 362, 364, 366, 368, and 370 of the third distributor set 360, despite the fact that distributors 364 and 384 are aligned. With respect to the fifth distributor set 400, the four distributors 402, 404, 406 and 408 are radially staggered about 45° with respect to respective distributors 382, 384, 386, and 388 of the fourth distributor set 380. It is contemplated that at least one distributor in a respective set may be radially staggered with respect to the closest distributor(s) in an adjacent set.

In this exemplary embodiment, the number of distributors in each set is, respectively, five, five, five, four, and four. However, any suitable number of distributor sets can be utilized, such as from 2-10 distributor sets. Moreover, these distributors can be orientated in different numbered sets, such as a first set of five distributors, a second set of five distributors, a third set of four distributors, and a fourth set of four distributors; or a first set of eight distributors, a second set of eight distributors, a third set of five or six distributors, and a fourth set of five or six distributors. Hence, the embodiments disclosed herein can provide the proper flexibility for conducting fluid catalytic cracking.

Additionally, the riser-reactor 200 may include a mixing chamber forming an enlarged chamber coupled at or near the bottom of the riser 280 to enhance mixing of the catalyst to achieve a substantial thermal equilibrium. Typically, the mixing chamber has a greater diameter than the riser 280. If a mixing chamber is coupled to the riser 280, in one exemplary embodiment the distributor sets can be coupled only to the riser 280, and not the mixing chamber.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for fluid catalytic cracking, comprising:
providing a stream through a plurality of distributors to a riser terminating in a reaction vessel wherein the plurality of distributors comprises a first distributor set comprising at least two distributors positioned around a perimeter of the riser, a second distributor set comprising at least two distributors positioned around the perimeter of the riser, and a third distributor set comprising at least two distributors positioned around the perimeter of the riser; wherein the third distributor set is positioned above the second distributor set and the second distributor set is positioned above the first distributor set; and the at least two distributors of the third distributor set are radially staggered from the at least two distributors of the second distributor set and the at least two distributors of the second distributor set are radially staggered from the at least two distributors of the first distributor set.

2. The process according to claim 1, further comprising fourth and fifth distributor sets each having at least two distributors wherein the fifth distributor set is above the fourth distributor set, and the fourth distributor set is above the third distributor set.

3. The process according to claim 2, wherein each distributor set is radially staggered from an adjacent distributor set.

4. The process according to claim 3, wherein the first distributor set comprises five distributors, the second distributor set comprises five distributors, the third distributor set comprises five distributors, the fourth distributor set comprises four distributors, and the fifth distributor set comprises four distributors.

5. The process according to claim 1, further comprising a fourth distributor set of at least two distributors wherein the fourth distributor set is above the third distributor set.

6. The process according to claim 5, wherein the first distributor set comprises five distributors, the second distributor set comprises five distributors, the third distributor set comprises four distributors, and the fourth distributor set comprises four distributors.

7. The process according to claim 1, wherein the respective distributors of the first and second distributor sets are positioned evenly around the perimeter of the riser.

8. The process according to claim 7, wherein the distributors of the second distributor set are offset by about 18° with respect to the distributors of the first distributor set.

9. The process according to claim 5, wherein a vertical distance between the third and fourth distributor sets is greater than a vertical distance between the first and second distributor sets.

10. The process according to claim 1, wherein the distributors, independently, are positioned about 10-about 170° from vertical.

11. A fluid catalytic cracking apparatus, comprising:
a riser terminating in a reaction vessel, wherein the riser comprises:
1) a first distributor set comprising at least two distributors positioned around a perimeter of the riser at a first elevation;
2) a second distributor set comprising at least two distributors positioned around the perimeter of the riser at a second elevation; and
3) a third distributor set comprising at least two distributors positioned around the perimeter of the riser at a third elevation wherein a first vertical distance between the first and second distributor sets is less than a second vertical distance between the second and third distributor sets; and
a regenerator having a regenerator standpipe connected to a bottom portion of the riser;
wherein the respective distributors of each distributor set are radially staggered with the distributors of an adjacent distributor set.

12. The apparatus according to claim 11, further comprising a fourth distributor set comprising at least two distributors positioned around the perimeter of the riser at a fourth elevation, wherein a third vertical distance is between the third and fourth distributor sets, and the third vertical distance is greater than the second vertical distance.

13. The apparatus according to claim 11, wherein the first distributor set comprises five distributors, the second distributor set comprises five distributors, the third distributor set comprises four distributors, and the fourth distributor set comprises four distributors.

14. The apparatus according to claim 11, wherein the distributors, independently, are positioned about 10-about 170° from vertical.

15. A fluid catalytic cracking apparatus, comprising:
a riser terminating in a reaction vessel, wherein the riser comprises:
1) a first distributor set comprising at least two distributors positioned around a perimeter of the riser at a first elevation;
2) a second distributor set comprising at least two distributors positioned around the perimeter of the riser at a second elevation different from the first elevation; and
3) a third distributor set comprising at least two distributors positioned around the perimeter of the riser at a third elevation different from the first elevation and the second elevation; wherein the at least two distributors of the first distributor set are radially staggered from the at least two distributors of the second distributor set and the at least two distributors of the second distributor set are radially staggered from the at least two distributors of the third distributor set.

16. The apparatus according to claim 15, further comprising a fourth distributor set comprising at least two distributors positioned around the perimeter of the riser at a fourth elevation, and the at least two distributors of the fourth distributor set are offset with respect to the at least two distributors of the third distributor set.

17. The apparatus according to claim 15, wherein the first distributor set comprises five distributors, the second distributor set comprises five distributors, and the third distributor set comprises for distributors.

18. The apparatus according to claim 15, wherein the first distributor set comprises five distributors, the second distributor set comprises five distributors, and the third distributor set comprises four distributors.

19. The apparatus according to claim 15, wherein the distributors, independently, of the first, second, third, and fourth distributor sets are positioned about 10-about 170° from vertical.

* * * * *